Figure 1:
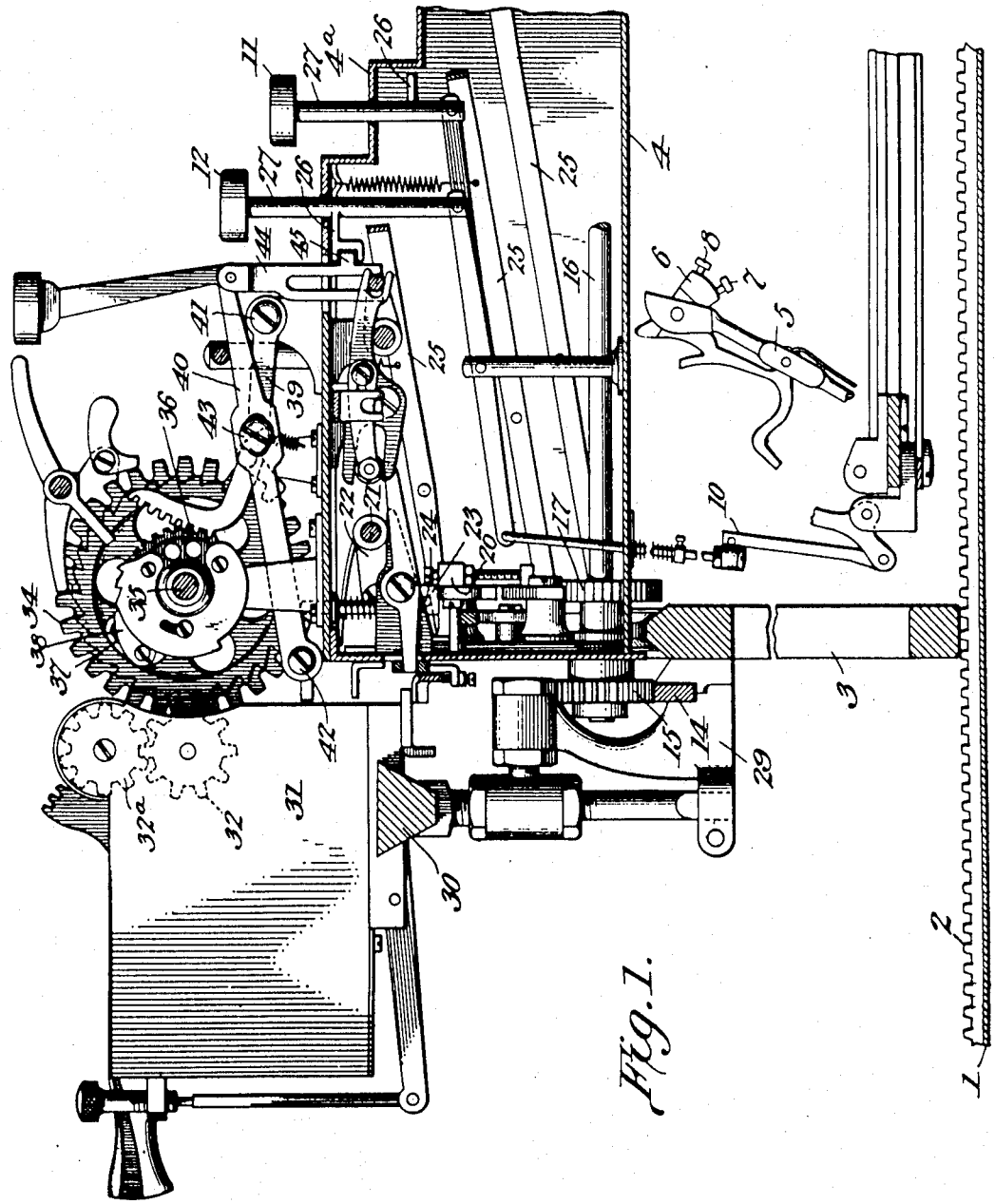

J. A. SMITH.
COMBINED TYPE WRITING, ADDING, AND SUBTRACTING MACHINE.
APPLICATION FILED MAY 18, 1908.

1,037,350.

Patented Sept. 3, 1912.

6 SHEETS—SHEET 1.

Witnesses:

Inventor,
John A. Smith
By L. G. Julihn
Atty.

J. A. SMITH.
COMBINED TYPE WRITING, ADDING, AND SUBTRACTING MACHINE.
APPLICATION FILED MAY 18, 1908.
1,037,350.
Patented Sept. 3, 1912.
6 SHEETS—SHEET 2.
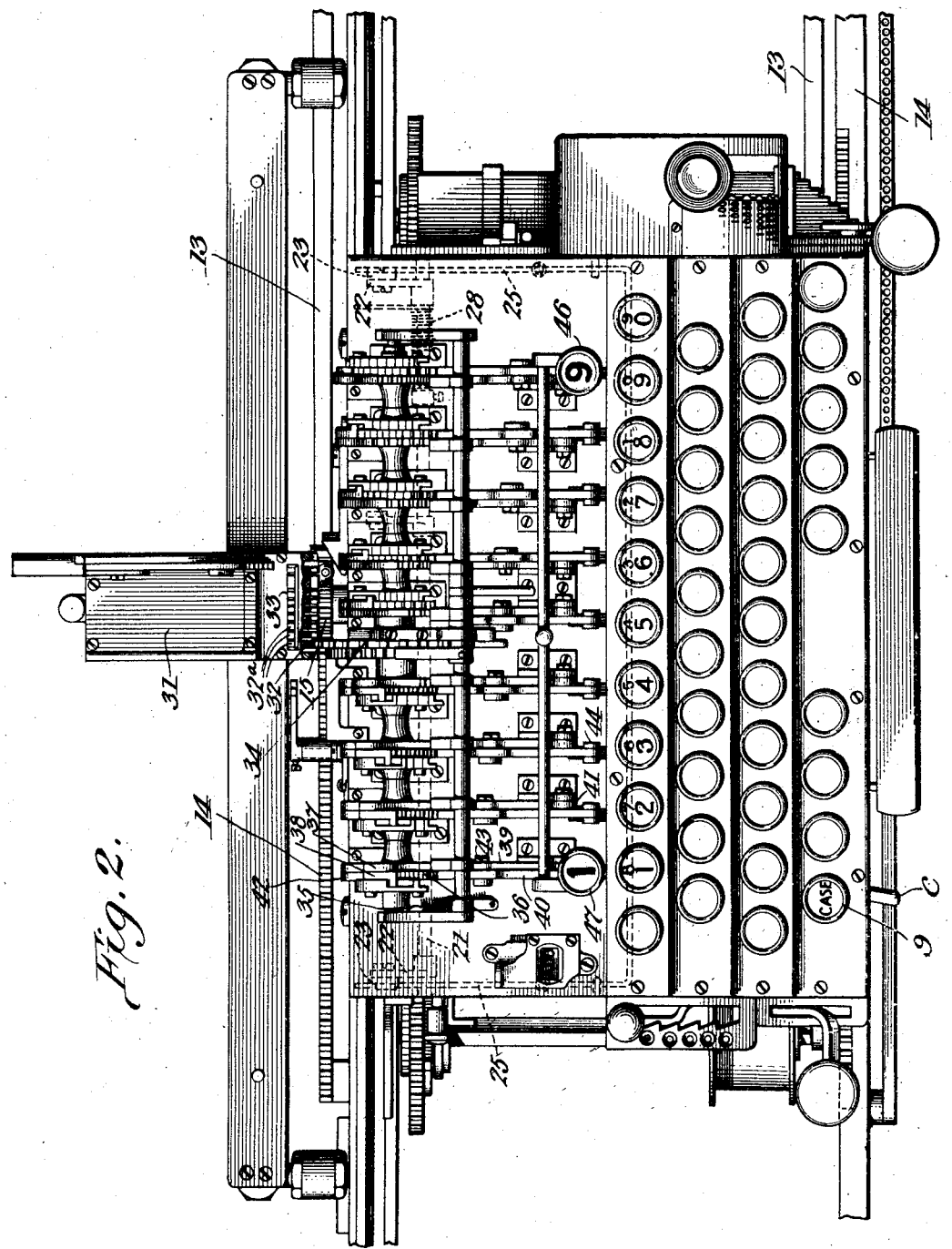
Witnesses:
Inventor,
John A. Smith
By L. G. Julihn
Atty.

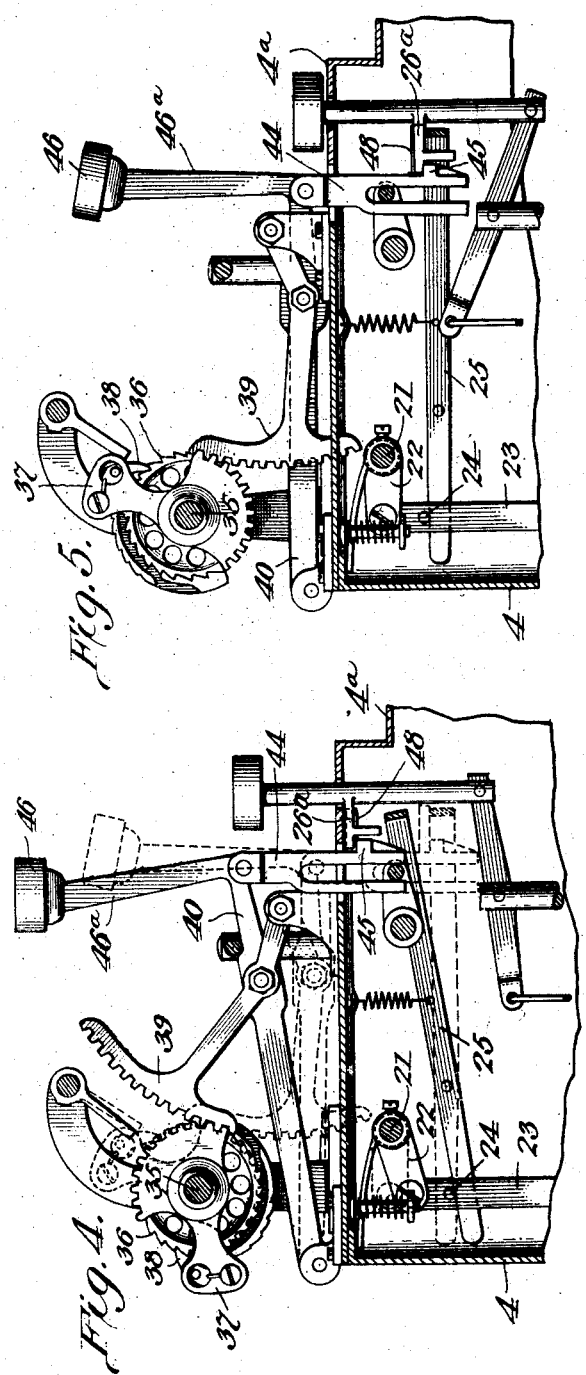
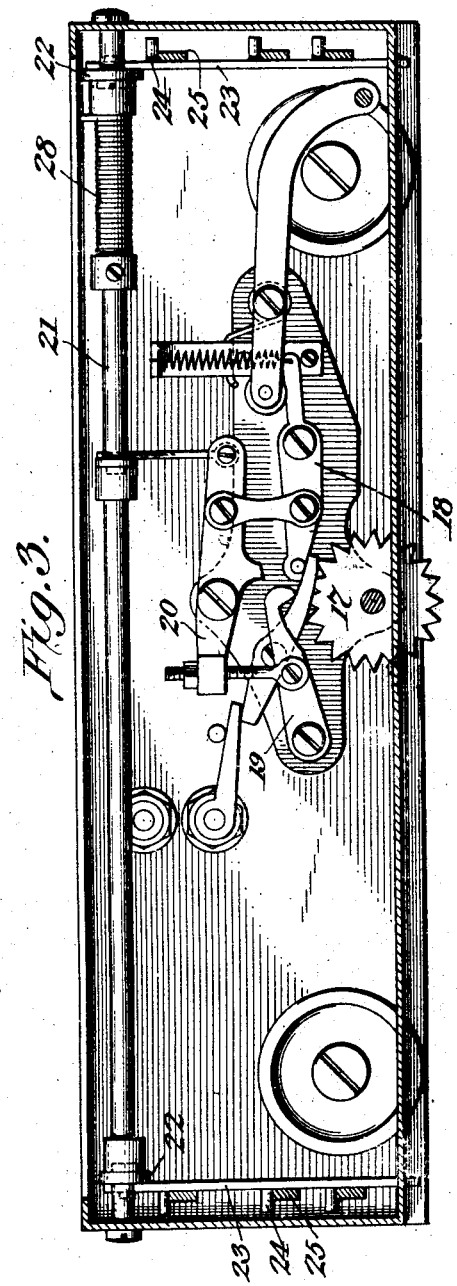

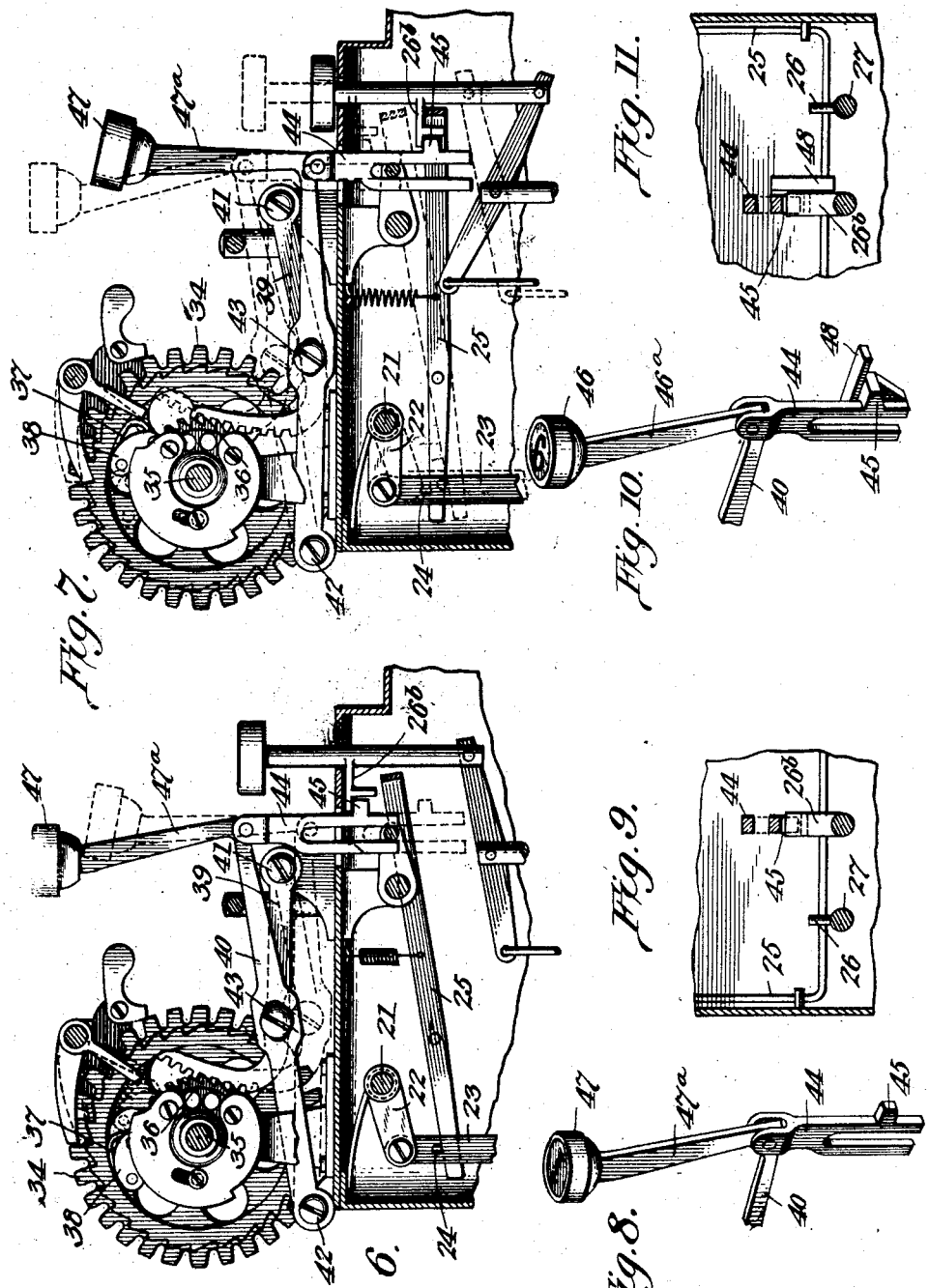

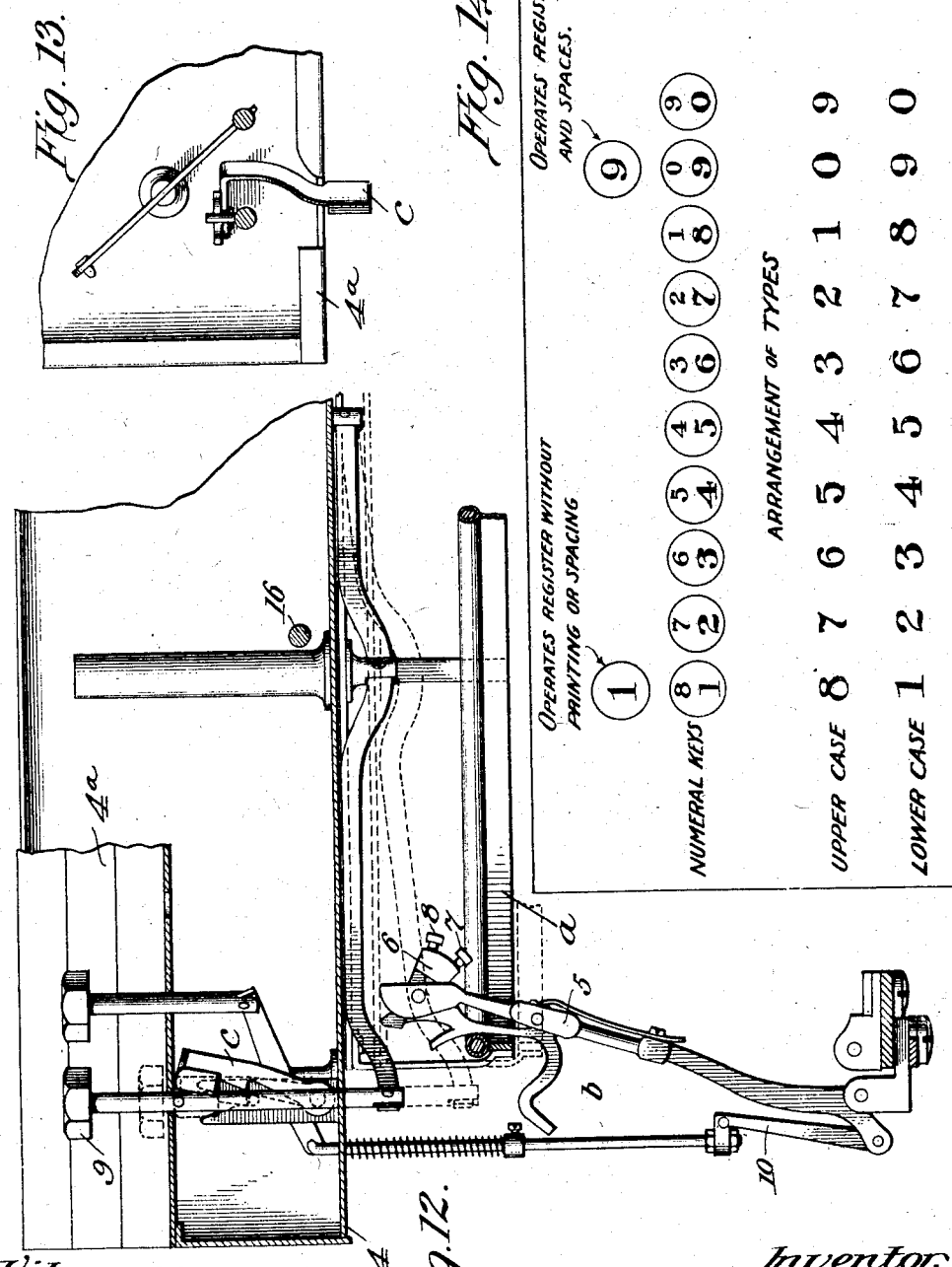

J. A. SMITH.
COMBINED TYPE WRITING, ADDING, AND SUBTRACTING MACHINE.
APPLICATION FILED MAY 18, 1908.

1,037,350.

Patented Sept. 3, 1912.

6 SHEETS—SHEET 6.

Witnesses:
J. Frank Culverwell.
D. A. Cohee

Inventor,
John A. Smith
By L. G. Julihn
Attorney.

UNITED STATES PATENT OFFICE.

JOHN A. SMITH, OF HARRISBURG, PENNSYLVANIA, ASSIGNOR TO ELLIOTT-FISHER COMPANY, OF NEW YORK, N. Y., A CORPORATION OF DELAWARE.

COMBINED TYPE-WRITING, ADDING, AND SUBTRACTING MACHINE.

1,037,350.  Specification of Letters Patent.  Patented Sept. 3, 1912.

Application filed May 18, 1908. Serial No. 433,493.

*To all whom it may concern:*

Be it known that I, JOHN A. SMITH, a citizen of the United States, residing at Harrisburg, in the county of Dauphin and State of Pennsylvania, have invented certain new and useful Improvements in Combined Type-Writing, Adding, and Subtracting Machines, of which the following is a specification.

This invention relates to an adding and subtracting machine wherein subtraction is accomplished by what is known as complemental addition.

Considered more specifically, the invention relates to a combined typewriting and adding machine and has for its object to provide a machine of this character with means facilitating complemental subtraction and including special keys for throwing nines into the register at the left of the subtrahend and for adding one to the remainder obtained by the complemental addition, thus securing the exact remainder instead of imposing upon the operator the necessity of disregarding a superfluous digit of high order and of giving a false value to a digit of low order, as is usual when subtraction is accomplished by complemental addition in ordinary adding machines.

A further object of the invention is to provide a machine of this character with means whereby both the minuend and subtrahend may be properly printed on the work sheet by the operation of the numeral keys simultaneously with the accumulation of the value of the minuend and the complement of the subtrahend in the computing device proper or register. To the accomplishment of this object each of the numeral keys is arranged to print either of two complemental digits and is also arranged, upon depression thereof, to accumulate a given value corresponding to that of one of the digits in the register, the key thus being arranged to print and add the same value or to print a given value and add the complement thereof.

A still further object of the invention is to equip a combined typewriting and adding machine with two sets of numeral keys so arranged that the machine may be operated to print and simultaneously add or subtract, or to add or subtract without printing.

Other objects, subordinate to those stated, will appear as the succeeding description is developed.

Figure 15:
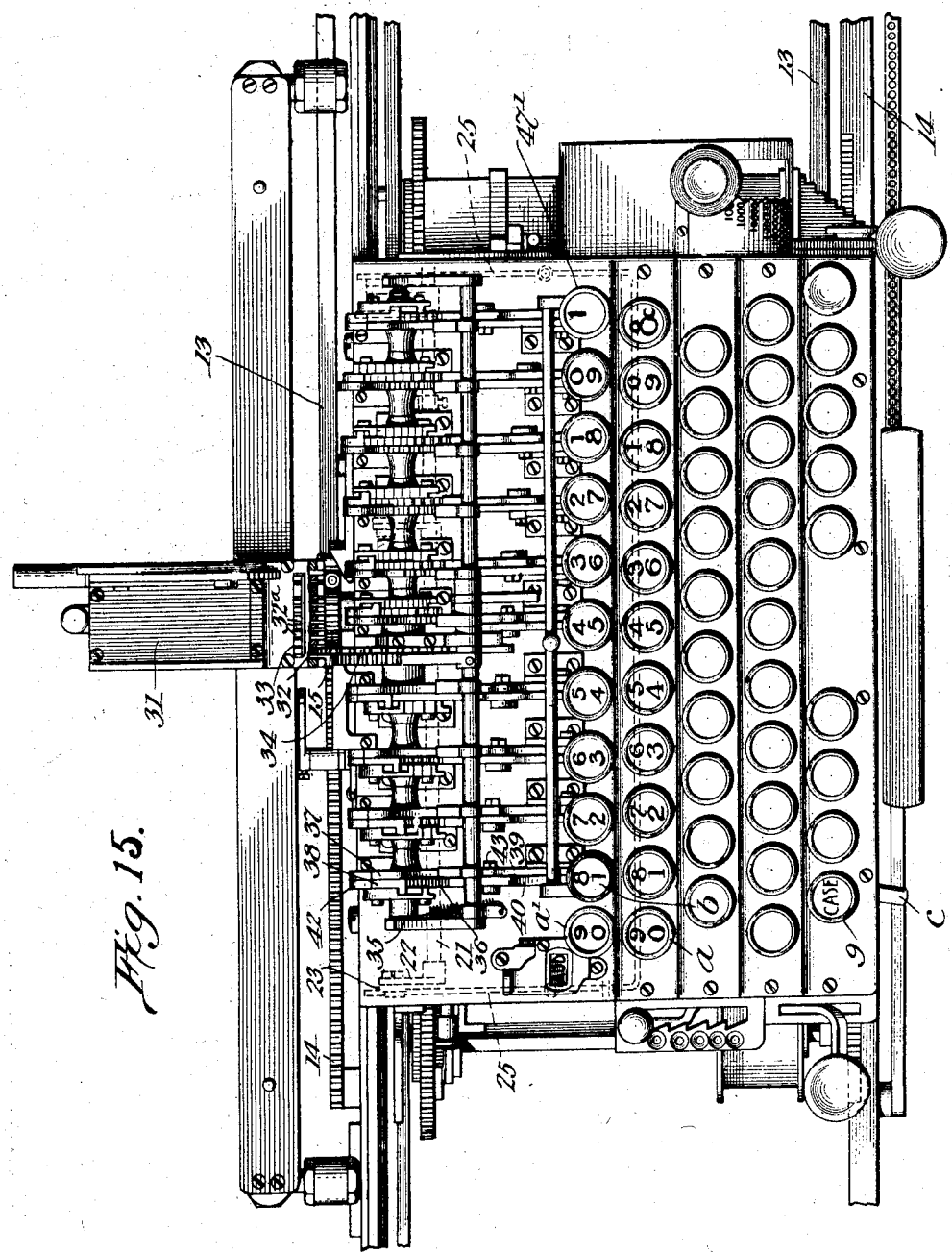

In the accompanying drawings—Figure 1 is a sectional view of an Elliott-Fisher billing machine equipped in accordance with my invention, certain of the parts being broken away and others omitted. Fig. 2 is a plan view of the same. Fig. 3 is a longitudinal sectional view through the carriage casing and showing more particularly the arrangement of the carriage feeding mechanism including the escapement. Fig. 4 is a sectional view showing more particularly the master wheel operating connections and the two "9" keys, the special "9" key being shown depressed in dotted lines to illustrate the manner in which this key is operated independently of the printing mechanism to throw 9 into the register and to operate the carriage feeding mechanism. Fig. 5 is a view similar to Fig. 4, but showing the result of depressing the ordinary "9" key to operate the printing mechanism and the master wheel operating connection and to also effect the feed of the carriage. Fig. 6 is a view similar to Fig. 4, but showing the arrangement of the two "1" keys, the special "1" key being shown in dotted lines to indicate the manner in which this key operates independently of both the printing mechanism and the carriage feeding mechanism to throw "1" into the register. Fig. 7 is a similar view of the same subject-matter, but showing in full lines the result of depressing the ordinary "1" key to operate the adding mechanism, the printing mechanism and the carriage feeding mechanism. Fig. 8 is a detail perspective view of the special or supplemental "1" key and its associated parts. Fig. 9 is a detail section through the connection between the two "1" keys. Fig. 10 is a detail perspective view of the special or supplemental "9" key and its associated parts. Fig. 11 is a detail section of the connection between the two "9" keys. Fig. 12 is a sectional view of a portion of the typewriter designed more particularly to show the case shift mechanism by means of which the operator may determine which of two complemental numbers will be printed upon the depression of a numeral key. Fig. 13 is a detail section designed to bring out more clearly the arrangement of the catch c for the case key. Fig. 14 is a diagrammatic view showing the arrangement of the supplemental keys, the numeral keys, and the upper and lower case types. Fig. 15 is a plan view of the machine equipped with two complete complements or banks of numeral keys, the keys of one bank being operative to print and add or subtract and the keys of the other bank being operative to add or subtract without printing, the latter bank of keys being supplemented by an additional 1-key having no connection with either the carriage spacing mechanism or the printing mechanism and adapted to be utilized for throwing "1" into the register when the machine is utilized for subtraction, either with or without printing.

*The Elliott-Fisher billing machine.*—The machine to which my invention is shown applied is what is known to commerce as the Elliott-Fisher billing machine. This machine is of the type known as flat platen typewriters and embraces a flat platen 1 equipped with longitudinal tracks or guides 2 upon which travels for line spacing a machine frame 3. Mounted to travel transversely of the platen on the frame 3 is a carriage 4, supporting printing mechanism in the form of type bars 5 equipped with type heads 6 each of which bears upper and lower case characters 7 and 8. Either of these characters may be brought in position to print by the operation of a case key 9 through the instrumentality of mechanism fully disclosed in Patent No. 708,213 to R. J. Fisher.

The particular manner in which the case shift is effected is immaterial. Suffice it to say that the lower case characters 8 are ordinarily arranged to print, but by depressing the case key 9 any type bar operated will present its upper case character at the printing point. In the illustrated arrangement the case key serves to depress a trip $a$ into coöperative relation with a trigger $b$ mounted on the type bar and normally retaining the plural type head 6 in lower case position. When the trip occupies its depressed position indicated in dotted lines in Fig. 12, the forward movement of the type bar to print brings the trigger into contact with the trip and the former is thrown back so that the type head will shift and thus present the upper case type to the printing point. It is usual also to provide a case key lock or latch $c$ by means of which the case key may be held in its depressed position.

The type bars 5 of the printing mechanism are operated through suitable intermediate connections 10 from letter and numeral keys 11 and 12 located above the casing 4ᵃ of the carriage 4. The carriage 4 is drawn in the direction of letter spacing by spring drums (not shown) which are mounted on the frame 3 and connected to the carriage by tapes 13, see Fig. 2. The advance of the carriage under the impulse of the propelling mechanism is controlled by carriage feeding mechanism which includes fixed racks 14 on the frame 3 (Figs. 1 and 2) engaged by front and rear feed pinions 15 (the latter only being shown, see Fig. 1) mounted at the opposite ends of a carriage feed spindle 16 rotatable in suitable bearings in the carriage and movable laterally with the latter.

Secured to the spindle 16 within the carriage casing 4ᵃ is an annular rack or escapement wheel 17, Figs. 1 and 3, alternately engaged by a holding dog 18 and a spacing dog 19, the rack and dogs constituting an escapement. The dogs 18 and 19 are swung in opposite directions by a rocker 20 suitably connected to the dogs and in turn operated from a rock shaft 21 having arms 22 from which are suspended vertically movable slides 23 having projecting pins 24 overlying the rear ends of swinging yokes 25, the front portions of which underlie pins 26 projecting from the stems 27 of the keys 11 and 12.

The rock shaft 21 is held in its normal position by a spring 28, see Fig. 3, which insures the engagement of the holding dog 18 with the wheel 17 and the consequent retention of the carriage until the carriage feeding mechanism is operated upon the depression of the key. When the key is depressed to print a character on the work sheet supported by the platen, the pin 26 carried by the stem of such key engages and swings one of the yokes 25 and thus elevates the slides 23 to rock the shaft 21 against the resistance of the spring 28. This rocking of the shaft swings the rocker 20 for the purpose of shifting the holding dog 18 out of engagement and the spacing dog 19 into engagement with the wheel 17. When the key is allowed to rise, the spring 28 causes the rocker 20 to be shifted back to its normal position, the wheel 17 rotating the distance of one tooth after the engagement of the dog 19 and before the wheel is reëngaged by the dog 18. This rotary movement of the wheel 17 and the feed spindle and pinions 16 and 15 effects a letter space movement of the carriage 4 subsequent to the printing of each character. For a more complete disclosure of the carriage feeding mechanism see Patent No. 765,861 to John A. Smith.

The line space movement of the frame 3 longitudinally of the platen is accomplished by means of line spacing mechanism which forms no part of the present invention.

*The adding mechanism.*—In addition to the described typewriter construction, the Elliott-Fisher billing machine includes adding mechanism. The numbers are typewritten in a column by the machine and are added in a register or computing device which is operated from the numeral keys.

At the rear side of the machine frame 3 suitable brackets 29 sustain a register supporting bar 30 in rear of the upper portion of the carriage 4. Longitudinally adjustable along the bar 30 is what is known as the register 31, which includes a casing within which is mounted a series of denominational members or number wheels 32 occupying different denominational positions, for instance units, tens, hundreds, thousands, etc., and having suitable carrying or transfer mechanism associated therewith and operative to carry or transfer the value accumulated upon each wheel to the wheel of next higher order. In some forms of registers the wheels 32 directly carry and exhibit the digits, 0 to 9 inclusive, displayed upon the outer faces of the peripheral teeth of said wheels. In the illustrated form of register, however, the wheels 32 operate a corresponding series of registering wheels 32ª so as to display the registered number at a relatively elevated sight opening 33 in the hood of the register casing, see Fig. 2.

The specific form of register employed is immaterial, so far as my present invention is concerned, but for a complete disclosure of an available form of register, attention is directed to Patent No. 825,494 to J. A. Smith.

The register 31 having been adjusted along the bar 30 to any desired column position, is rigidly secured by suitable means and occupies a fixed position relative to the traveling carriage 4 of the typewriter. The carriage is therefore utilized as a support for a master actuator 34 in the form of a toothed wheel mounted on an actuator shaft 35 and laterally movable with the carriage to engage successive number wheels or denominational members 32 of the register. The position of the typewriter carriage therefore determines or selects the denominational position of the master wheel with reference to the register so that when the carriage is disposed in position to print in any given denomination or order of the column, the master wheel 34 will be in engagement with the number wheel occupying a corresponding denominational position. Thus if the carriage is in position to print a digit in the tens order of the column, the master wheel will be opposite to and in engagement with the tens wheel of the register.

In order to accumulate in the register the value of each digit printed on the work sheet, provision is made whereby the depression of any one of the numeral keys 12 will effect a rotary movement of the master wheel corresponding in extent to the value of the particular key depressed. Thus the depression of the "1" key effects a single unit of movement to the master wheel 34, while the "9" key effects nine units of movement of said wheel, the intermediate keys similarly serving to actuate the master wheel in accordance with their unitary values. For the purpose of thus operating the master wheel 34 from the numeral keys 12 what is known in the art as differential mechanism is employed. This mechanism embraces a series of ratchet wheels 36 fixed to the actuator shaft 35, a driving arm 37 loosely swung from the shaft adjacent to each ratchet, a pawl 38 carried by each arm to engage and drive the adjacent ratchet, and a pair of crossed levers 39 and 40 serving as an operating connection between each numeral key and one of the driving arms. The levers 39 and 40 are fulcrumed at their front and rear ends respectively, as indicated at 41 and 42, and have loose pivotal connection at 43, the rear end of each lever 39 being geared to a driving arm, as clearly shown in Figs. 4 and 5, and the front end of each lever 40 supporting a pendent link 44. Ordinarily these links are detachably connected with the numeral keys by means of a lug 45 projecting from the link and engaging a notch in the adjacent pin 26, as shown in Fig. 1, so that the link and the adjacent numeral key are entirely interdependent. By so arranging the pivotal connections 43 of the several sets of levers as to vary the throw of each lever 39, the requisite differential movement necessary to cause each key to impart a different degree of movement to the master wheel is obtained. For a more complete disclosure of the register operating mechanism, attention is directed to Patent No. 829,971 to Laganke and Smith. It is also usual to employ means for automatically connecting and disconnecting the numeral keys from the adding mechanism under certain conditions by swinging the links 44 out of engagement with the keys. This mechanism is illustrated generally in the accompanying drawings, but is more fully shown in Patent No. 863,232 to J. A. Smith.

*The means facilitating subtraction by complemental addition.* (See Figs. 1 to 14.)—As is well understood by those skilled in the art, it is possible to utilize adding machines for subtraction by what is known as complemental addition, that is to say, by adding to the minuend the complement of the subtrahend. To facilitate this operation on the Elliott-Fisher machine, I provide each of the type heads 6 of the numeral typebars with two numeral types, the lower case type being the digit represented by the key and the upper case type being the complemental digit, considering 9 as the whole number. Thus the type bars will bear as lower case characters the digits 1 to 9 and 0 and the same bars will bear as upper case characters the complemental digits 8 to 0 and 9. For instance, the bar actuated by the "1" key will carry the "1" type in lower case position and the "8" type in the upper case position, the bar of the "2" key will bear the types "2" and "7" in lower and upper case positions, and so on throughout the series of bars, the total value of the two digits on any bar being 9.

The numeral keys bear indications corresponding to the digits on the bars; that is to say, on each key 12 is exhibited its upper and lower case numerals, as shown in Fig. 2, the former being preferably somewhat smaller than the normal or lower case numeral and of contrasting color. It will thus be noted that the case shift makes it possible to print different numerals, to-wit, a given digit or its complement, by the depression of a single key. Such key, however, will always effect a uniform rotary movement of the master wheel and consequently a uniform operation of the computing device. Thus a value corresponding to the lower case value of any key depressed will be added to the amount in the register, regardless of whether the upper or lower case digit is printed.

In performing subtraction by complemental addition, the machine, in normal or lower case position is operated to set up the minuend on the register by depressing the numeral keys whose lower case characters correspond to the digits included in the minuend. It is necessary to add to the minuend the value, not of the subtrahend, but of the complement thereof, and it is desirable to simultaneously print, not the complement of the subtrahend, but the subtrahend itself, so that the minuend and subtrahend will properly appear on the work sheet. To accomplish this purpose the case key is depressed to insure the printing of upper case characters and the operator proceeds to typewrite the subtrahend by depressing the proper numeral keys. In the operation of printing the subtrahend, however, the keys are selected with reference to the upper case designations, to-wit, the small numbers of contrasting color. The result will be that the subtrahend will be properly printed, but the complement of such subtrahend will be added to the minuend previously set up or accumulated in the register. For instance, suppose it is desired to perform the following example:

```
64
32
--
32
```

The minuend 64 is printed in the usual manner. The case key is then operated, and the numeral keys bearing the small or complementary characters 3 and 2 are operated. This will effect the printing of the subtrahend 32 under the minuend 64, but these two keys, instead of adding 32 to the register, will add the complement thereof, to-wit, 67, and the sum of the minuend and the complement of the subtrahend will show on the register a total of 131, thus:

```
 64
 67
---
131
```

This result is that which is ordinarily obtained when the operation of subtraction by complemental addition is performed on an ordinary adding machine and the operator's attention is directed to the fact that the left hand digit is 1 in excess of the proper value, while the right hand digit is 1 less than the proper value. Therefore to get the correct remainder, the operator mentally or otherwise subtracts 1 from the left hand digit and adds 1 to the right hand digit, which will give the proper remainder 32, thus:

```
64
67
--
31
 1
--
32
```

While the described construction of a combined typewriter and adder whereby subtraction may be accomplished is novel and useful, one of the primary objects of my invention is to avoid the registration of a false remainder, as for instance 131 in the above example, and to secure in lieu thereof the registration of the true remainder in order to eliminate any mental calculation or reservation on the part of the operator while copying on the work sheet the result of the substraction. To this end I provide the machine with two supplemental keys, to-wit a supplemental 9-key 46 and a supplemental 1-key 47. As is well understood, the excess value ordinarily obtained by complementary addition is due to the carrying from the number wheel representing the highest order of the subtrahend to the wheel of next higher order. Advantage is taken of this fact to eliminate the excess value by accumulating 9 on each of the wheels to the left of the subtrahend so that, when the carrying takes place, the excess will be eliminated by reason of the fact that it would be registered outside of the capacity of the register and therefore does not appear in the registered result. Obviously, however this operation of the machine to throw nines into the register must not be accompanied by the printing of the nines on the work sheet, although it is essential that the carriage feeding mechanism be coöperatively related to the supplemental 9-key so that as said key is successively operated the carriage will move forward step-by-step to present the master wheel to successive number wheels.

As will be seen by reference to Figs. 4 and 5, the 9-key 46 is mounted on a key stem 46ª rising from the front end of the lever 40 constituting an element of the connection between the usual 9-key 12 and the register actuator. By depressing the supplemental 9-key 46 therefore, the master wheel may be operated in precisely the same manner as said wheel is operated upon the depression of the ordinary 9-key. Obviously, however, special provision must be made to prevent the link 44, depressed by the supplemental 9-key 46, from depressing the adjacent 9-key, as this would result in the printing of 9 on the work sheet. Such provision consists in substituting for the notched pin connection 26, 45, shown in Fig. 1, a straight pin 26ª projecting from the stem of the 9-key 12 and over the lug 45 of the adjacent link. As a result of this, the depression of the usual 9-key, see Fig. 5, will operate the register actuating mechanism in the usual manner by carrying down the link 44 and with it the levers 40 and 39 so as to cause the operation of the printing mechanism, the adding mechanism, and the carriage spacing mechanism, as usual. If, however, the supplemental 9-key 46 is depressed, as shown in dotted lines in Fig. 4, the lug 45 will merely move away from the pin 26ª and as a result the adding mechanism will be operated to throw 9 into the register without in any way affecting the 9-key 12 or the printing mechanism connected therewith. In other words, the supplemental 9-key may be utilized to operate the adding mechanism independently of the typewriting mechanism.

As has heretofore been explained, the pins on the key stems serve to engage and operate the spacing yokes 25, but as the pin 26ª is not depressed when the supplemental 9-key is operated, other provision must be made for operating the yoke to effect the spacing of the carriage necessary to present the master wheel to successive number wheels. I therefore extend from the link 44 associated with the key 46, a yoke operating lug 48 located to one side of and out of interfering relation with the pin 26ª, but overlying the transverse bar of one of the yokes, see Figs. 4, 5, 10 and 11. Therefore when the supplemental 9-key 46 is operated, it will operate the adding mechanism and the carriage spacing mechanism independently of the printing mechanism of the typewriter, as indicated in dotted lines in Fig. 4, thus enabling nine units of value to be accumulated upon successive number wheels without printing on the work sheet.

The supplemental 1-key 47 is similar in arrangement to the supplemental 9-key just described, see Figs. 6 and 7, except that it is arranged to operate the connection between the master wheel and the usual 1-key, and except further that no provision is made for having this key operate the carriage spacing mechanism. To be more specific, the supplemental 1-key 47 is mounted on a stem 47ª which rises from the lever 40 of the 1-key connection of the differential mechanism, and the link 44 associated with said lever is provided with a lug 45 which underlies a straight pin 26ᵇ extending from the stem of the usual 1-key. Thus when the 1-key 12 is depressed, as shown in full lines in Fig. 7, the adding mechanism, the printing mechanism, and the carriage spacing mechanism will all be operated in the usual manner. If, however, the supplemental 1-key 47 is depressed, as shown in dotted lines in Fig. 6, the master wheel operating connection of the 1-key will be actuated independently of the 1-key and of the printing mechanism associated therewith and also independently of the carriage spacing mechanism, since it will be observed that the lug 45 is not of sufficient length to engage the adjacent spacing yoke and since the link associated with the supplemental 1-key 47 is not provided with a yoke operating lug such as the lug 48 associated with the supplemental 9-key.

*Recapitulation.* (Figs. 1 to 14.)—It will be seen that in accordance with my invention, the numeral type bars of a combined typewriting and adding machine are equipped with numeral types, as usual, in lower case position and with complementary numeral types in upper case position, and that upon the numeral keys of the typewriter are displayed the usual numerals and their complements so that any digit or the complement thereof may be printed, accordingly as the machine is arranged to print lower or upper case characters. Furthermore, that each of the numeral keys serves, when depressed, to accumulate in the register, a value corresponding to the lower case value of the key, regardless of the value of the digit printed by the depression of such key, so that a key may be depressed to simultaneously print and add the same value, or to print one value and accumulate the complement thereof in the register, as desired. Furthermore, that the machine is equipped with a special 9-key and a special 1-key located at the keyboard of the typewriter for convenient manipulation, the 9-key serving, upon depression, to accumulate nine units of value on any given number wheel of the register without operating the printing mechanism and also serving to cause the advance of the master means to the next number wheel, and the supplemental 1-key serving, upon depression, to accumulate one unit of value on a given number wheel without operating the printing mechanism or causing a lateral advance of the master means.

In accomplishing subtraction by means of the machine described, the minuend is first set up by the manipulation of the proper numeral keys, as in ordinary addition, the register reading as follows:

0000064 00

The master wheel is then retracted to a position opposite the number wheel of highest order and the supplemental 9-key 46 is operated until the master wheel arrives opposite the highest denomination of the subtrahend. In this example the subtrahend is 32 so that the 9-key will be operated five times or until the master wheel arrives in the tens position. The register will then read as follows:

9999964 00

The case key 9 will next be depressed to cause the printing of upper case characters upon the depression of the numeral keys. Then the subtrahend is printed by depressing the proper keys with reference to the upper case digits displayed thereon, for instance 32. This will cause the printing of the subtrahend 32 below the minuend 64, but, as the lower case values of the two keys depressed to print the subtrahend are 6 and 7 respectively, the subtrahend will be properly printed but the complement thereof will be accumulated in the register. Before the last digit of the subtrahend is printed, however, that is to say, when, in the example given, the master wheel comes opposite the units wheel of the register, and the printing point of the typewriter comes opposite the units order of the column, the supplemental 1-key is first operated to accumulate an extra unit of value. This operation, however, does not result in printing a digit on the work sheet, nor does it cause the carriage to advance. Therefore, if, after the accumulation of this extra 1, the last digit of the subtrahend is printed, it will be printed and accumulated in the same order, that is to say, in the units order of the column and register respectively. The operation of accumulating the subtrahend in the register may be illustrated thus:

```
0000064 00  registration of minuend.
99999       nines thrown in by supplemental 9-key.

9999964 00  registration after nines are thrown in.
      6     complement of subtrahend except last digit.

0000024 00  registration before 1 is thrown in.
      1     one thrown in by supplemental 1-key.

0000025 00  registration after one is thrown in.
      7     complement of final digit of subtrahend.

32     correct remainder.
```

It will be seen that when the first digit of the subtrahend, to-wit 3, is printed, the complement thereof, to-wit 6, will be accumulated in the register in the tens order. This amount, added to the amount already in the register, will give a total of 10,000,024.00. This however exceeds the capacity of the register and the 1 which has been carried through is therefore lost, the register reading 24. The 1 then accumulated in the register in the units position by the operation of the supplemental 1-key causes the register to read 25 and the accumulation in the units position of the complemental value, to-wit 7, of the lowest digit of the subtrahend will cause the registration of the correct remainder, to-wit 32. Therefore, when the operation of printing the minuend and subtrahend is complete, the register will show the correct remainder instead of the false remainder ordinarily obtained when adding machines are utilized for subtraction by complemental addition.

Attention is directed to the fact that the case shifting mechanism enters into novel combination with other described features of construction to select or determine which of two complemental sets of digits shall be printed upon the depression of the numeral keys. The specific form of case shift, however, is immaterial, the only requisite being that it shall enable the operator to control the printing of a digit or its complement. In the broad aspect of the invention therefore, the various well known forms of case shifts may be employed in lieu of that illustrated, whether the change of case be effected by shifting the type head, as in the illustrated arrangement, or by the shifting of the platen or type basket, as in certain well known typewriter constructions. It is also within the purview of the present invention to utilize the described improvements in connection with typewriters and adders wherein the typewriter is of the movable platen or standard type. So far as the present invention is concerned, it is obviously immaterial whether the keys and printing mechanism move over the work sheet or are stationary, or whether the relative movement of the register and its actuator is obtained by a movement of one or the other or both of these primary elements of the mechanism.

*The arrangement for adding or subtracting with or without printing.*—It will be seen that the levers 40 of the register actuating connections afford convenient mountings for an entire set of complemental keys adapted to accumulate from 1 to 9 units of value in any given order of the register without printing. Thus in Fig. 15 is shown in plan view a machine equipped with a complement of numeral keys *a* as in the construction already described, and an additional or supplemental set of numeral keys *b*, the latter being mounted on the levers 40 precisely as shown in Figs. 4 and 5. In fact, the plan view of that form of the invention shown in Fig. 15 has been deemed sufficient for illustrative purposes, because sectional views designated to show the relation of the keys a and b to each other and to the actuating mechanism of the register would be mere duplications of Figs. 4 and 5. This is for the reason that the supplemental set of nine numeral keys are designed to operate the register independently of the printing mechanism, but necessarily operate the carriage feeding mechanism to cause the master wheel to advance to successive number wheels of the register. Therefore, a section taken through any corresponding numeral keys of the two sets would appear as in Figs. 4 and 5, except of course for such variations in the several master wheel operating connections as is necessary to secure different degrees of movement of the master wheel upon the depression of the respective keys. Suffice it to say, therefore, that upon the depression of any numeral key a a given value will be accumulated in the register and either that value or the complement thereof will be printed, the carriage spacing mechanism being operated to advance the carriage, as heretofore described. Similarly, upon the operation of any numeral key b, of the supplemental set, the master wheel will be rotated a predetermined distance independently of the printing mechanism, and the carriage will be advanced precisely as heretofore described in connection with the operation of the key 46 shown in Figs. 4 and 5.

Upon each of the keys b, like the keys a, are exhibited complemental digits, so that by operating the keys with reference to one set of digits, corresponding values may be accumulated in the register, while the operation of the key with reference to the other set of digits will accumulate not the value of such digits, but the complements thereof. It is of course understood that the 0-key of the printing set or bank a does not operate the register because 0 has no value and when the upper case 9, carried by said key, is printed, the complement thereof is 0 and therefore there is no necessity for any operation of the adding mechanism for the purpose of accumulating such complement. It will also be seen that at the left hand end of the complemental or non-printing set b of numeral keys a 0-key is provided. This key is in effect a spacing key, since it is not designed to operate the printing mechanism and has no connection with the adding mechanism, except that in adding without printing, it is struck to space the carriage when 0 occurs in the number being set up on the register and performs the same function when, in the operation of subtraction, 9 appears in the number being set up, because in the latter event, 0 being the complement of 9, it is unnecessary to accumulate a value and the only necessity is to space the carriage. As this key, which for convenience will be designated a′, is a mere spacing key, it may be omitted and the usual space key employed in lieu thereof when a 0 occurs in the addition or a 9 occurs in the subtrahend of a subtraction. The use of the key a′, however, is preferable by reason of the digital indications thereon. It will be observed that in this arrangement the 1-key, designed to operate the extreme left hand actuating connection of the master wheel, is adapted to operate the carriage feeding mechanism, since it has already been stated that the relation of the keys shown in Figs. 4 and 5 is identical with the relation of the keys a and b which bear the digits 1 to 9 in lower case position. This is necessarily so because it is essential to the accumulation of a number either in subtraction or addition that the carriage be advanced one step after the value of each digit is added, whether that digit be 1 or more. Therefore, in order to provide for the throwing of 1 into the register without spacing the carriage, immediately before the last digit of the subtrahend is printed or the complement of such value is accumulated in the register, I extend the shaft 35 beyond the 9-key connection and equip the same with an additional operating connection identical in all essential respects with the other 1-key connection. This duplicate 1-key connection at the right hand end of the supplemental series of keys b, is provided with an additional or duplicate 1-key designated 47′ and its relation to the register operating connection and to the carriage feeding mechanism is precisely that shown in connection with the supplemental key 47 in Fig. 7, except that the link 44 is not cooperatively related to any other key, since the sole function of this duplicate or additional 1-key is to operate the register independently of all other keys or of the carriage feeding mechanism for the purpose of adding 1 to the register to make up the deficiency in the remainder before the complement of the last digit of the subtrahend is accumulated. A sectional view of this additional 1-key connection is thought to be unnecessary because it would be a mere duplicate of Fig. 7 with the lug 45 omitted.

The manipulation of the machine shown in Fig. 15 to accomplish addition either with or without printing is sufficiently obvious. In subtracting without printing, the keys b are manipulated precisely as the numeral keys are manipulated in the form of the invention first described, the 9-key and the additional 1-key 47′ being utilized to throw in the nines and the 1. In subtraction with printing, the keys a are manipulated as heretofore described, and the nines and 1 are thrown in by the manipulation of the two right hand keys of the complemental set $b$.

Before concluding, attention may be directed to the fact that the separable connection between the links 44 and the stems of the keys $a$ in Fig. 15 imparts a triple capability to the machine. Thus by manipulating the keys $a$ it is possible to both compute and print; by manipulating the keys $b$ it is possible to compute without printing; and by swinging the links 44 out of coöperative relation with the keys $a$, it is possible to manipulate the latter keys to print without computing.

It is thought that from the foregoing, the construction, operation and advantages of the described improvements will be fully comprehended, but I wish to be understood as reserving the right to effect such variations of the illustrated structure as may come fairly within the scope of the protection prayed.

What I claim is:—

1. In a recording and adding machine, the combination with a register, of printing mechanism arranged to print a number or the complement thereof, means for operating the printing mechanism to print a number and accumulate the value thereof in the register and also to print a number and accumulate the complement thereof in the register, and a supplemental key operative independently of the printing mechanism to accumulate a value in the register.

2. In a recording and adding machine, the combination with a register, of printing mechanism arranged to print a number or the complement thereof, means for operating the printing mechanism to print a number and accumulate the value thereof in the register and also to print a number and accumulate the complement thereof in the register, and a plurality of supplemental keys operative independently of the printing mechanism to accumulate different values in the register.

3. In a recording and adding machine, the combination with a register, of printing mechanism arranged to print a number or the complement thereof, means for operating the printing mechanism to print a number and accumulate the value thereof in the register and also to print a number and accumulate the complement thereof in the register, and a supplemental 1-key operative independently of the printing mechanism to accumulate in the register a unit of any desired denominational value.

4. In a recording and adding machine, the combination with a register, of printing mechanism arranged to print a number or the complement thereof, means for operating the printing mechanism to print a number and accumulate the value thereof in the register and also to print a number and accumulate the complement thereof in the register, and a supplemental 9-key operative independently of the printing mechanism to accumulate in the register nine units of any desired denominational value.

5. In a recording and adding machine, the combination with a register, of printing mechanism arranged to print a number or the complement thereof, means for operating the printing mechanism to print a number and accumulate the value thereof in the register and also to print a number and accumulate the complement thereof in the register, a supplemental 1-key operative independently of the printing mechanism to accumulate in the register a single unit of any denominational value, and a supplemental 9-key operative independently of the printing mechanism to accumulate in the register nine units of any desired denominational value.

6. In a combined typewriting and adding machine, the combination with a typewriter including a carriage, carriage feeding mechanism, numeral printing mechanism, and numeral keys, of a register including a series of denominational members, a master means for said members, means for operating said master means upon the depression of the numeral keys of the typewriter, and a supplemental 9-key operative independently of the printing mechanism to cause nine units of movement to be imparted to the master means and to also cause the operation of the carriage feeding mechanism.

7. In a combined typewriting and adding machine, the combination with a typewriter including a carriage, carriage feeding mechanism, numeral printing mechanism, and numeral keys, of a register including a series of denominational members, a master means for said members, means for operating said master means upon the depression of the numeral keys of the typewriter, a supplemental 1-key operative independently of both the printing mechanism and the carriage feeding mechanism to cause a single unit of movement of the master means, and a supplemental 9-key operative independently of the printing mechanism to operate the carriage feeding mechanism and to cause nine units of movement of the master means.

8. In a combined typewriting and adding machine, the combination with a typewriter including a carriage, carriage feeding mechanism, numeral keys, two complemental sets of digit types operative from the numeral keys, and means for determining which set of types shall be operated upon the depression of the keys, of a register including a series of denominational members and carrying means, a master actuator common to all of said denominational members, and means for operating the master actuator independently of the printing mechanism.

9. In a combined typewriting and adding machine, the combination with a typewriter including a carriage, carriage feeding mechanism, numeral keys, two complemental sets of digit types operative from the numeral keys, and means for determining which set of types shall be operated upon the depression of the keys, of a register including a series of denominational members and carrying means, a master actuator common to all of said denominational members, and a supplemental key operative independently of the printing mechanism to cause the operation of the actuator.

10. In a combined typewriting and adding machine, the combination with a typewriter including a carriage, carriage feeding mechanism, numeral keys, two complemental sets of digit types operative from the numeral keys, and means for determining which set of types shall be operated upon the depression of the keys, of a register including a series of denominational members and carrying means, a master actuator common to all of said denominational members, and a supplemental key operative independently of both the printing mechanism and the carriage feeding mechanism to cause the operation of the actuator.

11. In a combined typewriting and adding machine, the combination with a typewriter including a carriage, carriage feeding mechanism, numeral keys, two complemental sets of digit types operative from the numeral keys, and means for determining which set of types shall be operated upon the depression of the keys, of a register including a series of denominational members and carrying means, a master actuator common to all of said denominational members, and a supplemental key operative independently of the printing mechanism to cause the operation of both the master actuator and the carriage feeding mechanism.

12. In a combined typewriting and adding machine, the combination with a typewriter including a carriage, carriage feeding mechanism, numeral keys, two complemental sets of digit types operative from the numeral keys, and means for determining which set of types shall be operated upon the depression of the keys, of a register including a series of denominational members and carrying means, a master actuator common to all of said denominational members, and a plurality of supplemental keys operative independently of the printing mechanism to cause different degrees of movement to be imparted to the master actuator.

13. In a combined typewriting and adding machine, the combination with a typewriter including a carriage, carriage feeding mechanism, numeral keys, two complemental sets of digit types operative from the numeral keys, and means for determining which set of types shall be operated upon the depression of the keys, of a register including a series of denominational members and carrying means, a master actuator common to all of said denominational members, and a supplemental 1-key operative independently of the printing mechanism to cause a single unit of movement to be imparted to the master actuator.

14. In a combined typewriting and adding machine, the combination with a typewriter including a carriage, carriage feeding mechanism, numeral keys, two complemental sets of digit types operative from the numeral keys, and means for determining which set of types shall be operated upon the depression of the keys, of a register including a series of denominational members and carrying means, a master actuator common to all of said denominational members, and a supplemental 9-key operative independently of the printing mechanism to cause nine units of movement to be imparted to the master actuator.

15. In a combined typewriting and adding machine, the combination with a typewriter including a carriage, carriage feeding mechanism, numeral keys, two complemental sets of digit types operative from the numeral keys, and means for determining which set of types shall be operated upon the depression of the keys, of a register including a series of denominational members and carrying means, a master actuator common to all of said denominational members, a supplemental 1-key operative independently of the printing mechanism to cause a single unit of movement to be imparted to the master actuator, and a supplemental 9-key operative independently of the printing mechanism to effect nine units of movement of the master actuator and to cause the operation of the carriage feeding mechanism to change the denominational relation of the register and master actuator.

16. In a recording and adding machine, the combination with a register, a key depressible to cause the accumulation of a value in the register, a second key depressible to cause the accumulation of the same value in the register, and printing mechanism operative by one only of said keys to cause the printing of either of two complementary digits.

17. In a combined recording and adding machine, the combination with a register, a master actuator therefor, a carriage movable to change the denominational relation of the register and its actuator, carriage feeding mechanism, and printing mechanism, of a key common to both the register and printing mechanism, and a second key depressible to cause the operation of the register independently of the printing mechanism, both of said keys being adapted to operate the carriage feeding mechanism to change the denominational relation of the register and its actuator.

18. In a combined recording and adding machine, the combination with a register including a series of denominational members and carrying means, of a master actuator common to said members, a carriage movable to change the denominational relation of the register and its master actuator, carriage feeding mechanism controlling the movement of the carriage, printing mechanism including two complemental types, a key depressible to cause the operation of both the register and printing mechanism, means for determining which of the types shall be operated to print upon the depression of said key, and a supplemental key depressible to cause the operation of the master actuator independently of the printing mechanism, both of said keys being arranged to operate the carriage feeding mechanism to change the denominational relation of the register and its master actuator.

19. In a combined recording and adding machine, the combination with a register including a series of denominational members and carrying means, of a master actuator common to said members, a carriage movable to change the denominational relation of the register and its master actuator, carriage feeding mechanism controlling the movement of the carriage, printing mechanism including two complemental types, a key depressible to cause the operation of both the register and printing mechanism, means for determining which of the types shall be operated to print upon the depression of said key, a supplemental key depressible to cause the operation of the master actuator independently of the printing mechanism, both of said keys being arranged to operate the carriage feeding mechanism to change the denominational relation of the register and its master actuator, and a second supplemental key depressible to cause the operation of the master actuator independently of both the printing mechanism and the carriage feeding mechanism.

20. In a recording and computing machine, the combination with computing mechanism including a series of denominational members and a master actuator relatively movable to change the denominational relation of said members and actuator, of printing mechanism, a set of numeral keys controlling the operation of both the printing mechanism and the master actuator, and a second set of numeral keys controlling the operation of the actuator alone.

21. In a combined typewriter and adder, the combination with a typewriter including a carriage, printing mechanism and numeral keys, of a register, a master actuator operated from the numeral keys of the typewriter, and a second set of numeral keys for operating the register independently of the printing mechanism.

22. In combination, a typewriter having numeral keys, a set of lower case numeral types normally operated by the keys to print, a complemental set of upper case numeral types, a case key operative to cause the upper case types to be printed upon the depression of the keys, an adding mechanism operated upon the depression of the numeral keys to accumulate values represented by the lower case types, and an additional set of numeral keys depressible to cause the operation of the adding mechanism independently of the printing mechanism.

23. In combination, a typewriter having numeral keys each bearing complemental digits exhibited thereon, complemental types operated by each key to print, means for determining which type will be operated to print upon the depression of the key, adding mechanism operated upon the depression of the numeral keys, and a second set of numeral keys depressible to cause the operation of the adding mechanism independently of the printing mechanism and each having complemental digits exhibited thereon.

24. In a typewriting and adding machine, the combination with a carriage, printing mechanism including complemental digit types, a set of numeral keys each depressible to cause either of two complemental types to print, an adding mechanism operated upon the depression of the numeral keys, a second set of numeral keys depressible to cause the operation of the adding mechanism independently of the printing mechanism, carriage feeding mechanism operated upon the depression of each of the keys recited, and an additional 1-key adapted to operate the adding mechanism independently of both the printing mechanism and the carriage feeding mechanism.

25. In a recording and adding machine, the combination with adding mechanism and an actuator therefor, of printing mechanism operative to print complemental numbers and controlling the operation of the actuator, and keys operative to cause the operation of the actuator without printing.

26. In a combined typewriting adding machine, the combination with a typewriter including printing mechanism and keys, each of which is operative to cause the printing of either of two complementary digits, of an adding mechanism operated by said keys, and a second set of keys arranged to operate the adding mechanism independently of the printing mechanism, the keys of each set having complementary digits displayed thereon.

In testimony whereof I affix my signature in presence of two witnesses.

JOHN A. SMITH.

Witnesses:
SARA L. SWINGEL,
A. W. SWENGEL.

---

Copies of this patent may be obtained for five cents each, by addressing the "Commissioner of Patents, Washington, D. C."